United States Patent [19]

Otthofer, Jr.

[11]  4,397,072

[45]  Aug. 9, 1983

[54] VARIABLE WIDTH EMBOSSING ROLL

[75] Inventor: Jacob A. Otthofer, Jr., Lancaster, Pa.

[73] Assignee: Armstrong World Industries, Inc., Lancaster, Pa.

[21] Appl. No.: 295,631

[22] Filed: Aug. 24, 1981

[51] Int. Cl.³ ............................................. B23P 6/00
[52] U.S. Cl. .................................. 29/401.1; 29/121.1; 29/121.5; 29/124; 29/125; 29/148.4 D; 29/121.6; 101/401.1; 76/101 R
[58] Field of Search ..................... 29/121.1, 123, 124, 29/125, 401.1, 121.5, 148.4 D, 121.6, 121.8; 101/28, 401.1, 398, 400, 110, 99; 76/101 R; 72/191, 180, 182

[56] References Cited

U.S. PATENT DOCUMENTS

| 400,626 | 4/1889 | Alleigh | 101/28 |
| 567,918 | 9/1896 | Redeker et al. | 101/28 |
| 1,428,142 | 9/1922 | Canda | 29/121.6 |
| 2,416,123 | 2/1947 | Siemen | 29/125 |
| 3,268,378 | 8/1966 | Broderick | 101/28 |

Primary Examiner—Francis S. Husar
Assistant Examiner—David B. Jones

[57] ABSTRACT

The invention is directed to a method of expanding the width of an embossing roll which is composed of two or more embossing sleeves. Spacer washers are positioned between the sleeves to provide an embossing roll of the desired width. The outer edge of the spacer washers are then shaped to the pattern of the embossing sleeves so as to blend the pattern on the edge of one embossing sleeve to the pattern on an adjacent edge of another embossing sleeve.

1 Claim, 2 Drawing Figures

VARIABLE WIDTH EMBOSSING ROLL

BACKGROUND OF THE INVENTION

1. Field of the Invention

The invention is directed to a method of making an embossing sleeve and more particularly to the making of an embossing sleeve which may be of variable width.

2. Description of the Prior Art

U.S. Pat. No. 3,385,213 discloses a printing drum which utilizes disks to separate print heads or type wheels.

U.S. Pat. No. 147,767 shows the use of removable rings slipped on the shaft of an embossing roll for the purpose of varying the pattern of the embossing roll.

U.S. Pat. No. 1,962,148 discloses the concept of using interchangeable disks on a cement roll to place a feeding disk at a desired position on the roll.

None of the prior art structures disclose the specifically claimed method of expanding an embossing pattern by way of washers which are placed between a series of embossing sleeves forming the embossing roll. These spacer washers are shaped on their outer surface to blend in with the embossing pattern of the embossing sleeve so that there will be continuity of pattern from the edge of one embossing sleeve to the edge of an adjacent embossing sleeve.

SUMMARY OF THE INVENTION

The invention is directed to a method of expanding the width of at least two or more embossing sleeves mounted on an embossing mandrel. The first step of the method is the assembling of the sleeves on the mandrel with a washer positioned between each of the sleeves. There are two or more embossing sleeves used and, depending upon the number of washers used, each washer will have a thickness which is equal to a fraction of the number of washers used. That is, each washer has a thickness equal to a fraction of the width increase and the total number of washers add up to the width increase that one desires to expand the embossing roll. Each of the washers has a diameter greater than the maximum diameter of the embossing sleeves. The second step of the method is the cutting and shaping of the outside edge of each washer to a contour pattern so that there will be a blending of the pattern from the edge of one embossing sleeve to the edge of the adjacent embossing sleeve where the two sleeves are spaced apart by a washer with the surface of the washer shaped to provide the blending of the two patterns of the embossing sleeves.

BRIEF DESCRIPTION OF THE DRAWING

It is conventional to form an embossing roll 2 through the use of a mandrel 4 on which are placed a plurality of sleeves 6 which have thereon an embossing pattern. For simplicity sake the embossing pattern has been shown as a raised rib 8. During an embossing operation there is a growth or increase in the width of the product being manufactured due to the manufacturing process. Consequently, the embossing roll has to be made to compensate for this increased width which occurs during the manufacturing process. It's the handling during the processing which causes an increase in the growth of the product, and the embossing roll must be larger than the finished pattern size to compensate for this. With the development of new materials for flooring there has resulted in the development of products with different growth characteristics. Therefore, a set of embossing sleeves on an embossing roll which were manufactured for one particular flooring material may be used now on another flooring material which has a greater growth factor. Now the embossing roll is undersized. Normally such a problem would be taken care of by making sets of embossing sleeves to form embossing rolls of different widths to compensate for the different widths of the flooring materials used during the manufacturing process. Consequently, you would have a set of sleeves for each different width characteristic of the different material being embossed. Such a provision of plural sets of sleeves can be very expensive.

It is now possible to use a standard set of sleeves and provide washer structures which will expand the sleeves to fit the different growth characteristics of the flooring materials. However, one cannot just place washers in between the sleeves and expand the spacing of the sleeves since there must be continuity of the pattern from one sleeve to the next sleeve or from one sleeve to the washer to the next sleeve.

Figure 1:
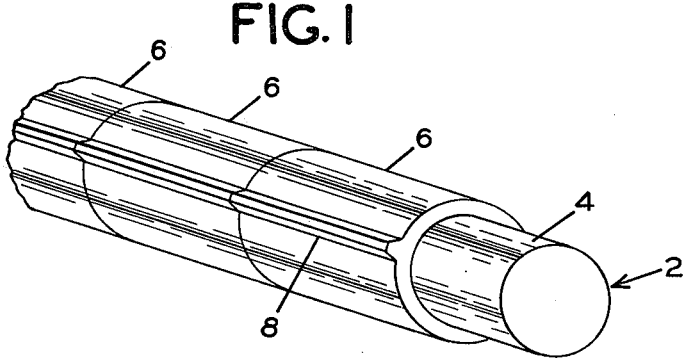
Figure 2:
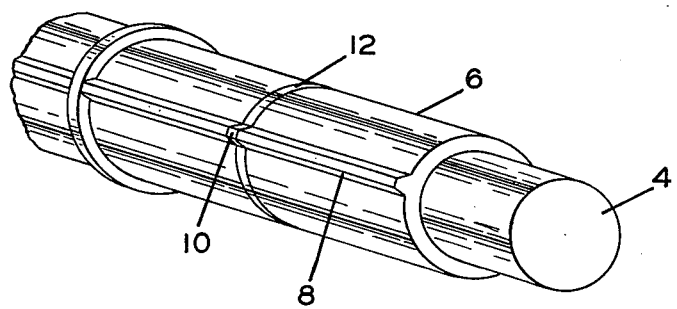

Assuming that one has a set of eight embossing sleeves 6 which would be placed on a mandrel 4 in FIG. 2, one would then need seven washers to expand this pattern. If one wished to increase the pattern width by $\frac{1}{8}''$ or 0.125'', then one would need seven washers which are 0.018'' thick. There would be placed one washer between each sleeve and this would affect a total pattern growth of 0.126''. The sleeves are made to be pressed on and held tightly on the mandrel. The washers would be made with an inside diameter which is the same as the inside diameter of the embossing sleeve. The washers would have a thickness which is 1/7 of the desired change in the overall pattern width. The washers would be larger in diameter than the valley areas of the embossing pattern and at least of a diameter above the raised areas of the embossing sleeve so as to have an outside diameter equal to the largest diameter that one would secure on an embossing sleeve. That is, the outside surface of the washer would be at least in the same plane as the highest part of the embossing sleeve. Since the embossing sleeves have normally a 5.730'' outside diameter, the outside diameter of the washer would be at least 0.005'' greater than this diameter. After the embossing sleeves and washers are assembled on the mandrel 4 the washer edges will be cut, ground or filed to fit the pattern contour of the embossing roll so that there will be a blending of the pattern from the edge of one sleeve to the edge of the other sleeve which two sleeves are spaced apart by the thickness of the washer.

Normally, the washers will be made of aluminum and this thin soft aluminum can be readily cut to provide a transition embossing pattern on its outer surface. There now results in an increased embossing roll width which will not have a spacing or gap between the two spaced apart edges of two adjacent embossing sleeves, but will have a transition pattern carved on the washer in this space between the two sleeves so that there will be continuity of the pattern from one embossing sleeve across the washer to the next embossing sleeve. This is clearly shown in FIG. 2 where the ridge 8 clearly extends from the right hand sleeve 6 to the next adjacent sleeve 6 with the transition area 10 formed in the washer 12.

What is claimed is:

1. A method of expanding the width of at least two or more embossing sleeves mounted on an embossing mandrel, comprising the steps of:

(a) assembling said sleeves on said mandrel with a washer positioned between each of said sleeves, said washer having a thickness equal to a fraction of the width increase that one desires to expand the embossing roll, with each said washer having a diameter greater than the maximum diameter of the embossing sleeves, and (b) cutting and shaping the outside edge of each washer to a contour pattern so that there will be a blending of the pattern from the edge of one sleeve to the edge of the other sleeve there the two sleeves are spaced apart by a washer with the surface of the washer shaped to provide the blending of the two patterns.

* * * * *